United States Patent [19]
Woywood et al.
[11] 3,869,705
[45] Mar. 4, 1975

[54] ELECTRONIC TECHNIQUE FOR MAKING MULTICHANNEL, SPATIAL-CARRIER-ENCODED RECORDINGS

[75] Inventors: Dennis Joseph Woywood, Cherry Hill, N.J.; Stephen Leonard Corsover, Philadelphia, Pa.

[73] Assignee: RCA Corporation, New York, N.Y.

[22] Filed: Sept. 15, 1972

[21] Appl. No.: 289,356

[52] U.S. Cl. .......................................... 358/5, 358/7
[51] Int. Cl. ........................ H04n 9/00, H04n 5/84
[58] Field of Search .......................... 178/5.4 CD, 178/6.7 R, 6.7 A, DIG. 28, 5.2 D, 5.2 R, 5.4 BD; 179/100.3 A, 100.3 K; 346/110; 350/162 R, 162 SF; 352/66

[56] References Cited

UNITED STATES PATENTS

| | | | |
|---|---|---|---|
| 2,736,762 | 2/1956 | Kell | 178/5.4 CD |
| 2,769,028 | 10/1956 | Webb | 178/6.7 A |
| 2,912,487 | 11/1959 | Horsley | 178/5.2 D |
| 2,919,302 | 12/1959 | Glenn, Jr. | 178/6.6 TP |
| 3,078,338 | 2/1963 | Glenn, Jr. | 178/5.4 BD |
| 3,522,371 | 7/1970 | Goldmark | 178/5.4 CD |
| 3,572,900 | 3/1971 | Bouche | 178/5.4 BD |
| 3,585,283 | 6/1971 | Graser | 178/5.4 BD |
| 3,624,278 | 11/1971 | Heckscher | 350/162 SF |
| 3,627,909 | 12/1971 | Liu et al. | 178/5.4 BD |

*Primary Examiner*—Robert L. Griffin
*Assistant Examiner*—George G. Stellar
*Attorney, Agent, or Firm*—Edward J. Norton; George J. Seligsohn

[57] ABSTRACT

A line-scanned flying spot of a recorder is intensity modulated by a plurality of amplitude-modulated carrier frequencies all of which are higher than but coherent with the line scan frequency and are characterized in that the division of the respective carrier frequencies by the line-scan frequency yield quotients which are different from each other. Such a technique is suitable for recording a color-encoded scene on a given area of black-and-white film.

9 Claims, 5 Drawing Figures

ELECTRONIC TECHNIQUE FOR MAKING MULTICHANNEL, SPATIAL-CARRIER-ENCODED RECORDINGS

This invention relates to the technique of recording a plurality of different information channels on the same area of a recording medium by employing a separate spatial carrier for each information channel and, more particularly, to an improved technique utilizing electronics for doing so.

Purely optical techniques employing separate spatial carriers obtained from ruled diffraction gratings for recording a color-encoded scene on a given area of a black-and-white photographic film have been known in the art for many years. One such purely optical technique is disclosed in U.S. Pat. No. 2,050,417, which issued to Bocca on Aug. 11, 1936. Bocca employs three individual color-separation transparencies, manifesting respectively the green, red and blue components of a given scene, and three angularly displaced diffraction gratings to record a color-encoded photograph of a given scene on the same given area of a black-and-white film. This is accomplished by sequentially exposing this given area of the film to each of the color-separation transparencies in turn with a different one of the diffraction gratings being disposed intermediate the transparency and the film during each of the sequential exposures of the film. Thus, the recording on the film comprises respective green, red and blue information channels each consisting of a separate amplitude-modulated spatial carrier, occupying the same area. The angular orientation of each of the respective spatial carriers corresponds with the orientation of the grating employed in recording that spatial carrier.

The scene depicted by the color-encoded recording on the developed film may be displayed in full color by disposing a color filter intermediate the recording and a projection screen and illuminating the recording. This is because each of the spatial carriers in the recording separately diffract the light incident thereon to produce a zero diffraction order and one or more pairs of higher diffraction orders. The color filter is opaque except for transparent regions at predetermined locations thereof. Certain of these transparent regions pass only the green portion of white incident light, other regions pass only the red portion of white incident light, and still other regions pass only the blue portion of white incident light. Due to the fact that the spatial carriers are angularly displaced with respect to each other, the first order diffraction components arrive at the color filter at different angular positions, which correspond with the location of the appropriate transparent portions of the color filter. In this manner, the color filter blocks the undesired zero diffraction order and other higher diffraction orders than the first diffraction order of each separate spatial carrier. The respective first diffraction orders of the various spatial carriers which pass through the color filter simultaneously provide registered green, red and blue images of the depicted scene on a display screen to provide a full color image of the scene.

It would appear that such a color-encoded recording of a scene on black-and-white film would be quite useful, since the color information is retained permanently and does not deteriorate over a period of time as do the color dyes employed in conventional color transparencies. Thus, for instance, such a color-encoded technique would be most suitable for making the archival copy of a color motion picture film. However, in practice, this is not done.

One reason, it is believed, that such spatial-carrier encoding as disclosed in the aforesaid Bocca patent has not been used more extensively is because the purely optical technique required to make the color-encoded recording on black-and-white film, described above, is slow and cumbersome.

The present invention overcomes this problem by employing electronic means to synthetically generate a spatial-carrier encoded multi-channel information signal, such as a color or other multi-spectral information signal. In particular, a given area of a recording medium is scanned with a flying spot which is intensity-modulated in accordance with an electronically-generated signal which results in a recorded pattern incorporating separate spatial carriers each of which is separately amplitude-modulated in accordance with information obtained from a separate one of a plurality of different channels.

These and other features and advantages of the present invention will become more apparent from the following detailed description taken together with the accompanying drawing, in which.

Figure 3A:
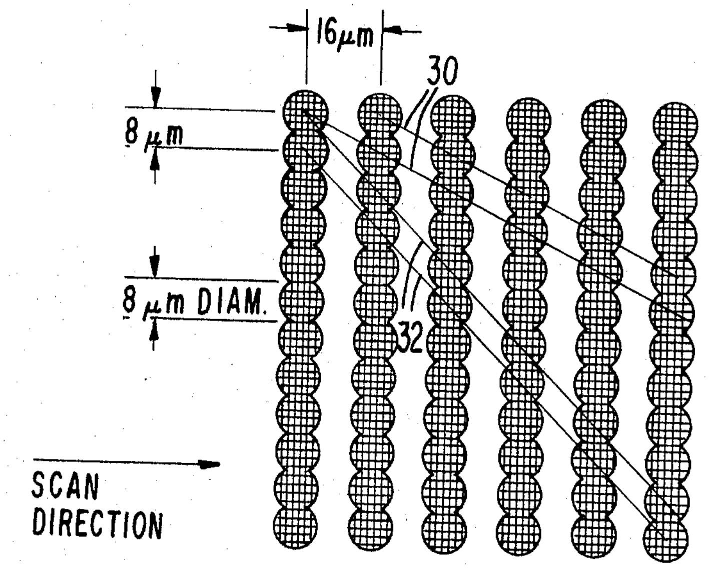
Figure 3B:
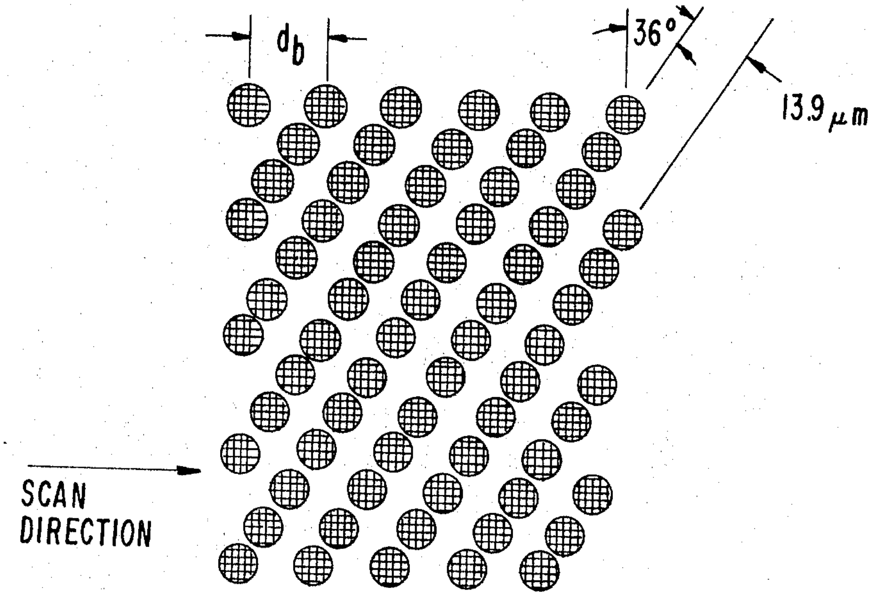
Figure 3C:
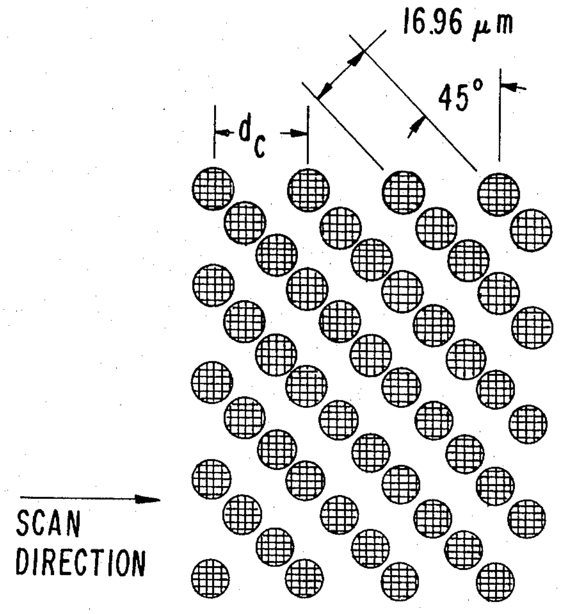

FIGS. 3*a* and 3*b* and 3*c*, respectively, show examples of three different spatial carriers of the type employed in the present invention.

Figure 1:
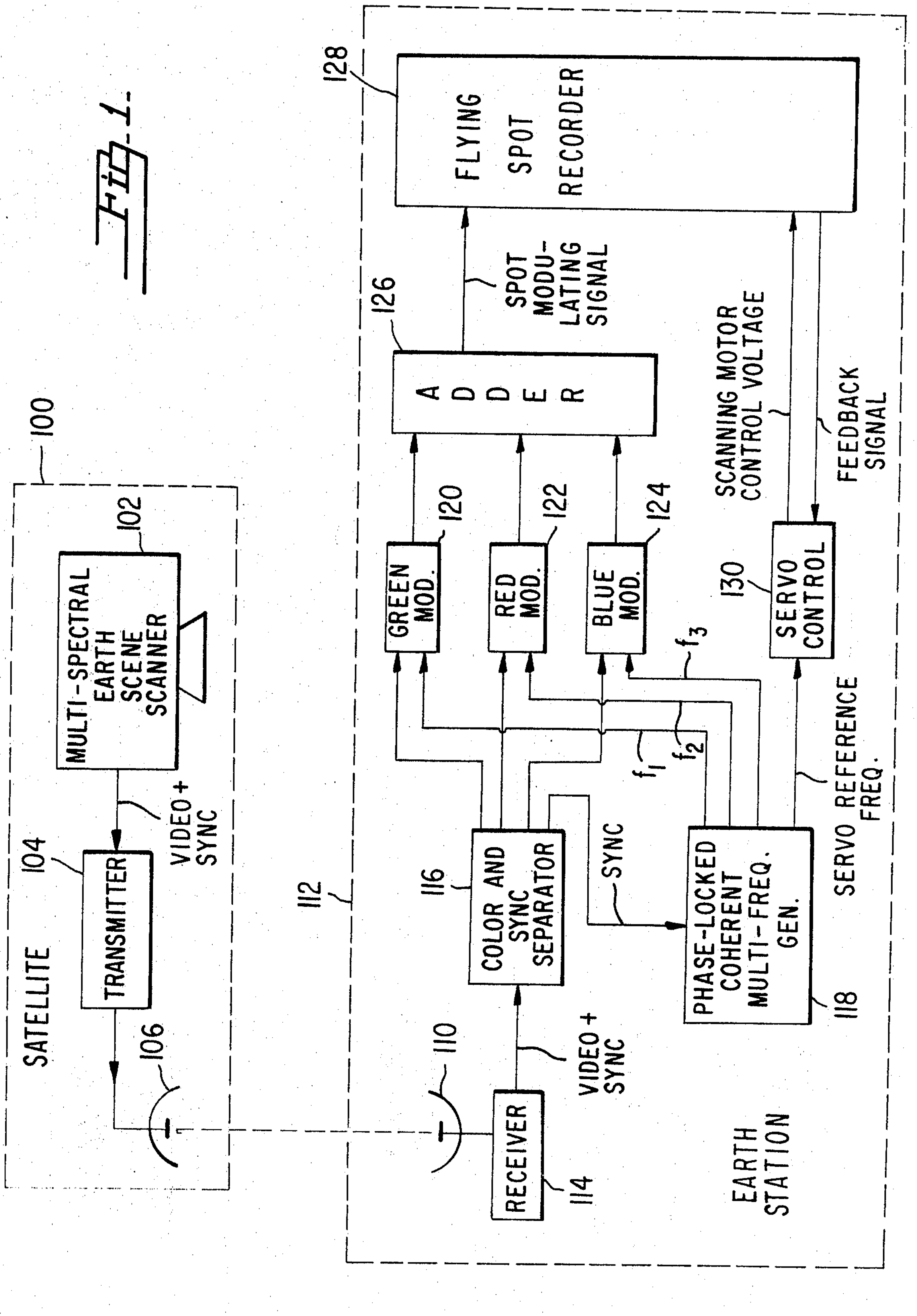
FIG. 1 is a first illustrative embodiment of the present invention in which multi-spectral video information received from a remote transmitter is recorded as a spatial-carrier encoded recording.

Referring now to FIG. 1, there is shown in diagrammatic form an earth satellite 100 on which is located multi-spectral earth scene scanner 102, transmitter 104 and directional antenna 106. Scanner 102, which includes either a color-television camera or a group of synchronized scanning radiometers each operating at a different spectral wavelength, views a scene on the earth and derives therefrom the corresponding video signal, which includes multi-channel luminance and chrominance material. This video signal along with a sync information signal indicative of the beginning of each line scan of the television camera or radiometers, as the case may be, is applied as an input to transmitter 104, where it modulates the carrier frequency of transmitter 104. This modulates the carrier is applied to directional antenna 106 and is radiated to the earth, where it is picked up by directional antenna 110 of earth station 112.

Receiver 114 demodulates the signal received by antenna 110 to thereby recover at its output the video and sync signal applied as an input to transmitter 104. The video and sync signal at the output of receiver 114 is applied as an input to color and sync separator 116, which includes the required filters, clippers, detectors and/or other conventional circuitry employed to segregate the video information into separate color channels, as well as to provide a separate sync channel for the sync information. All of the circuitry so far described is conventional in the transmission and receipt of coloro video information.

Phase-locked coherent multi-frequency generator 118 may be frequency synthesizer of the type well-known in the art which include a voltage-controlled oscillator, frequency dividers, frequency multipliers and one or more phase-locked loops for generating a plurality of separate coherent signals of different predetermined frequencies all of which are phase-locked with a given reference frequency. In the case of generator 118, the given reference frequency is provided by the sync signal input thereto from separator 116.

As shown, generator 118 provides four different predetermined frequency signals as outputs therefrom. The first of these signals, having frequency $f_1$, is applied as one input to green modulator 120, which has a green-information channel from separator 116 applied as the other input thereto. In a similar manner, red modulator 122 has a signal having frequency $f_2$ and the red-information channel from separator 116 applies as separate inputs thereto, and blue modulator 124 has a signal having frequency $f_3$ and blue-information channel of separator 116 applied as separate inputs thereto.

The output of green modulator 120 is a carrier frequency $f_1$ amplitude modulated in accordance with the green-information signal. In a similar manner, the output from red modulator 122 is a carrier frequency $f_2$ amplitude modulated in accordance with the red information signal and the output from blue modulator 124 is a carrier frequency $f_3$ amplitude modulated in accordance with the blue information signal.

The output from green modulator 120, red modulator 122 and blue modulator 124 are summed in adder 126 and then applied as a spot-modulating signal input of flying spot recorder 128. Although flying spot recorder 128 may be either a light beam recorder or an electron beam recorder, hereinafter flying spot recorder 128 will be assumed to be a light beam recorder for illustrative purposes. As is conventional, flying spot recorder 128 includes a light source, such as a laser, a light modulator for intensity modulating a beam of light from the light source in accordance with the instantaneous amplitude of the spot modulating signal applied thereto from adder 126, a recording medium, such as a photographic film, and therebetween spot forming optics and a scanning mirror for focusing the intensity-modulated light beam to a spot on the surface of the recorded medium and line-scanning this spot in a given direction across the recording medium while the recording medium is moved at a preselected low speed with respect to the horizontal line scan in a direction perpendicular to the given direction of the line scan. Line scanning is accomplished by rotating the scanning mirror with a servo-controlled scanning motor. As is known, in order that the scene recorded on the recording medium by flying spot recorder 128 correspond with the scene observed by multi-spectral earth scene scanner 102, it is necessary that the line scanning by flying spot recorder 128 by synchronized with the scanning of scanner 102. This is accomplished by controlling the angular velocity and position of the scanning mirror in accordance with the scanning motor control voltage which is applied from servo control 130 to the scanning motor of recorder 128.

Servo control 130 has a servo reference frequency signal applied as a command signal input thereto from generator 118. The servo reference frequency is time coherent with the sync signal applied as an input to generator 118 from separator 116, as well as with the $f_1$, $f_2$ and $f_3$ outputs of generator 118. Servo control 130 also has a feedback signal applied as a second input thereto from flying spot recorder 128. As is known in the art, such a feedback signal, which may be obtained from a transducer coupled to the shaft of the scanning motor or to the scanning mirror or recorder 128, manifests the actual angular position of the scanning mirror, while the phase of the servo reference frequency manifests the desired angular position of the scanning mirror. Servo control 130, in response to an error signal derived from the difference between the servo reference frequency signal and the feedback signal, alters a predetermined parameter (such as amplitude or frequency) of the scanning motor control voltage applied therefrom to scanning motor of recorder 128 to change the speed thereof to minimize such errors.

The system of FIG. 1, as just described, will result in a pattern deterimined by the spot modulating signal applied thereto from adder 126 being recorded on the recording medium. This pattern will be determined by the particular values of each of frequencies $f_1$, $f_2$ and $f_3$ with respect to the synchronized line-scanning frequency of scanner 102 and recorder 128, as well as the luminance and chrominance information in the earth scene actually being observed by scanner 102. The effect on the recorded pattern of these respective $f_1$, $f_2$ and $f_3$ derived from generator 118 will be discussed.

These three different frequencies $f_1$, $f_2$ and $f_3$ are all large mulitples of the line scan frequency and are characterized in that the division of the respective frequencies $f_1$, $f_2$ and $f_3$ by the line scan frequency results in different quotients from each other. This means that the multiples may be either integers or non-integers.

In any given system, such parameters as the spot size the line scan rate, the scan-to-scan spacing between two adjacent line scans and the total length of a line scan employed by flying spot recorder 128 in recording a pattern on a recording medium have predetermined fixed values for that system. Therefore, in any given system, the respective values and frequencies $f_1$, $f_2$ and $f_3$ may be selected in accordance parameters to include as part of the recorded pattern three different corresponding spatial carriers each of which comprises a synthetic diffraction grating, similar to those indicated respectively by FIGS. 3a, 3b, and 3c. Although in practice three such gratings coexist in the same area and are amplitude modulated in accordance with the scene information, for purposes of clarity they have been shown separately.

In each of FIGS. 3a, 3b and 3c, it is assumed that the line scan direction is horizontal, the spot diameter is 8 micrometers and that the scan-to-scan spacing between two adjacent lines is also 8 micrometers. In any scan line of FIG. 3a, 3b and 3c, each circle corresponds with a given half cycle of a respective one of the carrier frequencies $f_1$, $f_2$ and $f_3$ and the space between two adjacent circles corresponds with the other half-cycle of that respective one of carrier frequencies $f_1$, $f_2$ and $f_3$. Each of FIGS. 3a, 3b and 3c are merely meant to show various, somewhat simplified, patterns that the synthetic gratings may take, and not to show the entire recorded raster. The actual recorded raster includes many more scan lines than are shown and the length of each scan line contains many more spatial wavelengths than are shown.

In FIG. 3a, it is assumed that the highest recorded frequency has been selected which is consistent with a spot diameter of 8 micrometers. Thus, under these assumed conditions, the recorded wavelength is 16 micrometers and is equal to the line spacing of the shortest spatial wavelength of the synthetic grating as shown in FIG. 3*a*. It will be noted that in FIG. 3*a* corresponding circles of different horizontal scan lines line up to provide a vertical synthetic grating. This means that in the case of FIG. 3*a* the scan-line frequency is an integral multiple (a remainder of zero) of the scan-line frequency. Therefore, the overall length of a scan line must be the same integral multiple of the recorded wavelength, 16 micrometers. (Any other recording frequency which is an integral multiple of the scan-line frequency also would provide a vertical synthetic grating, but with a different line spacing.)

The pattern shown in FIG. 3*a*, is complex, including not only a vertical synthetic grating having a line spacing or spatial wavelength equal to its recorded wavelength of 16 micrometers, but also many additional gratings all of which are angularly disposed to and have a shorter spatial wavelength than the vertical synthetic grating. For instances, one such additional grating is formed by a set of parallel lines, such as lines 30, interconnecting a circle in one scan line with a circle in the next scan line immediately to its right. Another additional grating is formed by a set of parallel lines, such as lines 32, interconnecting a circle in one scan line to that circle in a scan line to lines below and immediately to the right of the first-mentioned circle. Another one of these additional gratings is the raster itself which forms a horizontal grating. However, in FIG. 3*a*, the effect of the raster grating is minimized by making the line-to-line spacing between two successive scan lines substantially equal to the spot diameter of a scan line.

If the value of a respective one of frequencies $f_1$, $f_2$ and $f_3$ forming a synthetic grating is not an integral multiple of the scan line frequency, all of the complex synthetic gratings formed are oblique with respect to the vertical. Examples of this are shown in FIGS. 3*b*, where a particular one of the diffraction gratings is at an oblique angle of 36°, and in FIG. 3*c*, where the oblique angle is 45°. It is assumed that the respective patterns of FIGS. 3*a*, 3*b* and 3*c* all employ the same line scan frequency, the same spot diameter of 8 micrometers and the same line-to-line spacing between adjacent scans of 8 micrometers.

In the case of the pattern as shown in FIGS. 3*b* and 3*c*, the value of the carrier frequencies $f_1$, $f_2$ and $f_3$ employed are lower than the value of the carrier frequency employed in FIG. 3*a*. This means that the recorded wavelength $d_b$ in FIG. 3*b* and the recorded wavelength $b_c$ in FIG. 3*c* will be greater than the 16 micrometers of FIG. 3*a*. In the case of FIG. 3*b*, the size of the remainder resulting from the division of the carrier frequency by the line scan frequency is adjusted to provide a 36° synthetic grating with a spatial wavelength or line spacing of 13.9 micrometers. It can easily be shown by trigonometry that in this case the recorded wavelength $d_b$ is in the order of 17.2 micrometers. This is larger than the 16 micrometer recorded wavelength of FIG. 3*a*.

In FIG. 3*c* the remainder resulting from dividing the value of the carrier frequency employed by the line scan frequency results in a 45° synthetic grating being recorded with a spatial wavelength or line spacing of 16.96 micrometers. It can be shown by trigonometry that the recorded wavelength $d_c$ is about 23 micrometers. This is also larger than the 16 micrometers spatial wavelength of FIG. 3*a*.

It is essential that all the carrier frequencies $f_1$, $f_2$ and $f_3$ and the scan frequency be coherent with respect to each other. This means that they all of them must be derived from a common oscillator whose frequency value is a composite number having the respective values $f_1$, $f_2$ and $f_3$ and the servo reference frequency as respective factors thereof. Since the values of $f_1$, $f_2$, $f_3$ are all in the order of thousands of times higher than the scan frequency, the frequency of the common oscillator must necessarily be quite high with respect to the scan frequency. For instance, in one experimental system, a common oscillator frequency of 27.36 megahertz was required to provide the three carrier frequencies $f_1$, $f_2$ and $f_3$ and the servo reference frequency, although the line scan frequency was only 24 lines per second. Care should therefore be taken in choosing the frequencies $f_1$, $f_2$ and $f_3$ so that the common oscillator frequency is not unduly high.

The recording made with the system of FIG. 1 is generally similar to a recording made with the system disclosed in the Bocca patent, but differs therefrom in certain important respects. Most important is that in the Bocca system, zero brightness is manifested by black and non-zero scene brightness is manifested by varying degrees of white in accordance with the value of the scene brightness, just as in a conventional transparency. Therefore, the Bocca transparency recording includes baseband image information in addition to spatialcarrier modulated image information. In the present invention, with zero scene brightness the light modulator is at its bias point, and a gray bias level of light is recorded on the recording medium. With non-zero scene brightness, the recording spot power varies about this bias point and when viewed outside the display system, an encoded transparency recording appears gray and virtually no image information can be seen; i.e., the encoded transparency recording of the present invention, unlike Bocca's transparency recording, contains substantially no baseband image information.

In the conventional display system the Fourier transform of the baseband information is centered directly around the optical axis. In the Bocca system the presence of the baseband Fourier transform precludes using the area around the optical axis for carrier modulated information because of crosstalk. In the present invention the absence of the baseband information and its resultant Fourier transform allows the frequency of the lowest spatial carrier to be reduced without causing crosstalk.

Figure 2:
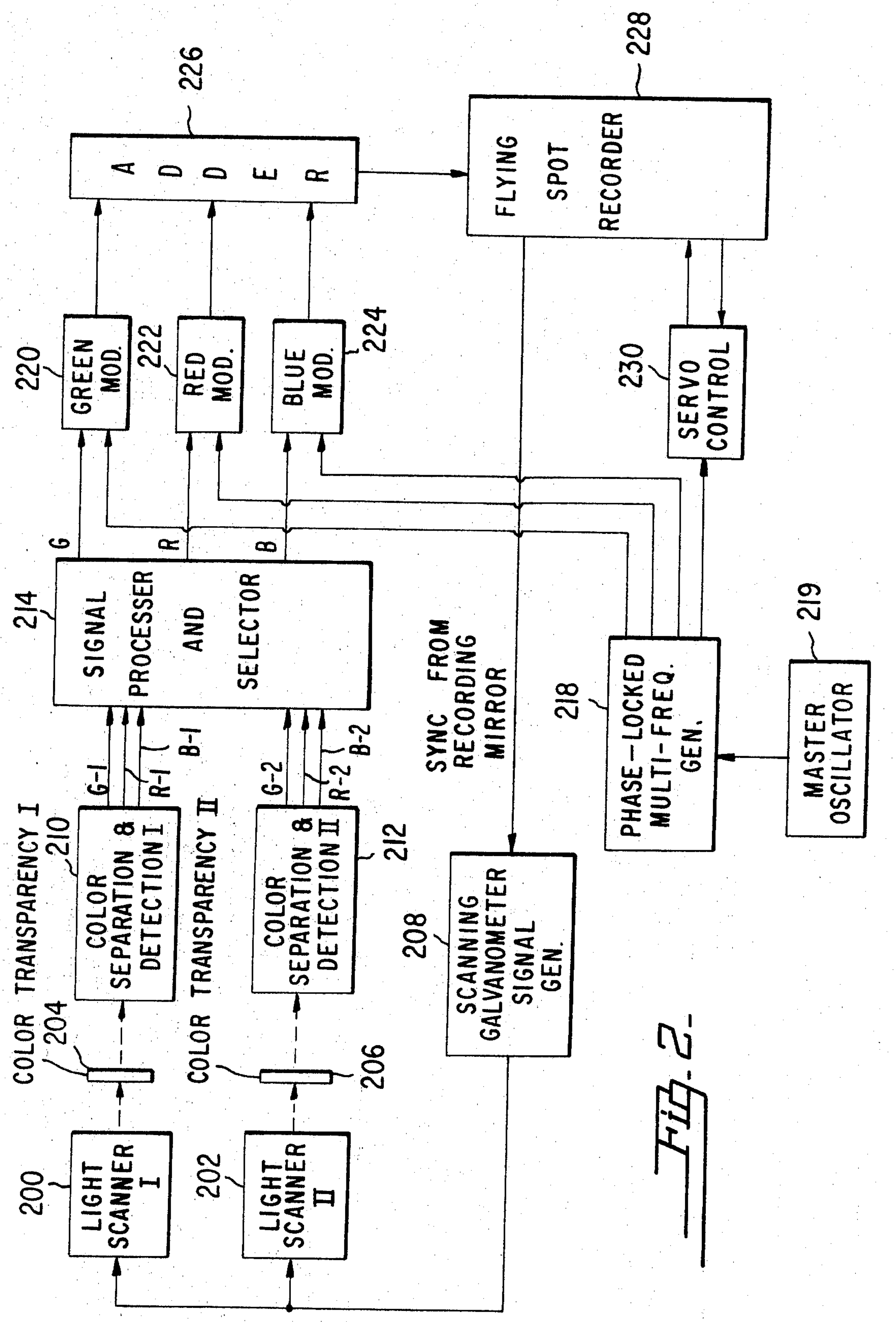
FIG. 2 is a second illustrative embodiment of the present invention showing its use in a film editor for recording an archival copy of a color motion picture.

Referring now to FIG. 2, there is shown a somewhat different arrangement of the present invention for use in editing motion picture film. In FIG. 2, elements 220, 222, 224, 226, and 230 are identical in structure and function to the corresponding elements 120, 122, 124, 126 and 130 of FIG. 1. Flying spot recorder 228 of FIG. 2 includes means, such as a photodiode responsive to the scanning recording mirror of recorder 228 occupying a predetermined position, for deriving a sync signal at the line-scan frequency from the recording mirror. In all other respects flying spot recorder 228 is identical to flying spot recorder 128 of FIG. 1. Phase-locked coherent multi-frequency generator 218 is genrally similar in structure and function to generator 118 of FIG. 1, but is synchronized by and phase locked to the coherent frequency output of master oscillator 219, rather being synchronized by a remote sync signal, as in the case of FIG. 1.

FIG. 2 includes a plurality of similar light scanners, such as light scanner I 200 and light scanner II 202. Each light scanner includes a light source and optics including a galvanometer mirror for scanning a corresponding color transparency, such as color transparency I 204 and color transparency II 206. The scanning galvanometers of scanners 200 and 202 are energized by the output from scanning galvanometer signal generator 208 which has the sync signal from the recording mirror of flying spot recorder 228 applied as an input thereto. Generator 208 derives a periodic triangle wave having a frequency equal to that of the scanning recording mirror of recorder 228 as manifested by the sync signal therefrom. In this manner the scanning of light scanners 200 and 202 are in substantially exact synchronism with the scanning of the recording mirror of flying spot recorder 228.

Each of color transparencies 204 and 206 are moved slowly at an appropriate rate in a direction perpendicular to the line scan thereof by transport means, not shown.

The transparency information beam emerging from each color transparency is applied as an input to a corresponding color separation and detection means, such as color separation and detection means I 210 and color separation and detection means II 212. The color separation and detection means may include required optics, dichroic mirrors, and a photodetector for each color component to thereby derive a separate channel video signal output for each color component of the transparency information signal applied to that means. Color separation and detection means 210 derives a set of channel video outputs G-1, R-1 and B-1 which are applied as separate inputs to signal processor and selector 214. Similarly, color separation and detection means 212 derives a set of channel video signal outputs G-2, R-2 and B-2 which are applied as separate inputs to signal processor and selector 214. Signal processor and selector 214, which is capable of selectively forwarding the first or second set of inputs thereto to the corresponding G, R and B outputs therefrom, may also include means for selectively modifying and combining any of its inputs before applying them to its three channel outputs G, R and B. Signal processor and selector 214 may be controlled manually and/or by a computer which has been preprogrammed. In any case, it is the set of signals present on output conductors G, R and B of signal processor and selector 214 which are applied as respective channel-modulating signals to each of modulators 220, 222 and 224 respectively.

The system of FIG. 2 is employed in the making of an archival motion picture film from a plurality of separate but corresponding original color films. For instance, in making a motion picture, a single scene may be simultaneously filmed by a plurality of physically separated motion picture cameras. As part of making the final edited archival copy of the film, a film editor selectively combines certain frames of a scene taken by a first camera with other frames of the scene taken by a second camera. Since certain parameters, such as lighting for instance, are not identical for physically separated cameras during the filming of the scene, it is often necessary, to enchance or otherwise modify the chrominance and luminance information in the original films as part of the editing process. Conventional film editing, in which electronic processing is not employed, is a very slow and painstaking task as compared to the editing of color video television tapes, where electronic processing is available. The system of FIG. 2, by making it possible to convert the optical color signal to an electronic video signal before processing, greatly simplifies and speeds up the task of film editing. Furthermore, the resulting archival film is not itself a color transparency, but is a color-encoded black-white film. Thus, the archival film may be stored for many years without loss of color information, which occurs because the dyes employed in a color transparency tends to deteriorate over a long period of time. The archival copy may be employed at any time to rerecord a secondary copy of the motion picture on color film for showing in a motion picture theater.

Although in both FIGS. 1 and 2, it has been assumed that the separate video channels manifest respectively, green, red and blue color information, this is not essential. First, in FIG. 1, multi-spectral earth scene scanner 102 may include a radiometer sensitive at an infra-red wavelength, for instance. In this case, one of the video channels would manifest this infra-red information. Of course, in order to observe this infra-red information during display of a transparency recording, a light beam of a given visible color may be employed. In fact, the information manifested by the separate video channels may be completely unrelated to any intrinsic color information. In this case, color may be employed in a display solely for the purpose of maintaining a distinction in a display image of information obtained from separate channels.

What is claimed is:

1. A multichannel recording system comprising a flying spot recorder, means for generating a number of separate coherent signals having predetermined relative frequencies with respect to each other including a coherent reference signal and a plurality of coherent carrier signals each of which is phase locked with said reference signal, means coupled to said recorder and having said reference signal applied thereto for line-scanning the flying spot of said recorder at a rate proportional to the frequency of and phase locked with said reference signal, said carrier signals each having a frequency which is higher than said line-scan rate and being characterized in that the respective quotients yielded by the division of the frequency of each respective carrier signal by said line-scan rate are different, modulation means for individually amplitude modulating each respective carrier signal with a separate applied channel information signal, and means for applying said amplitude-modulated carrier signals to said recorder for simultaneously intensity modulating said flying spot with all of said amplitude-modulated carrier signals.

2. The system defined in claim 1, Wherein said generating means comprises a phase-locked frequency synthesizer for generating said plurality of coherent signals in phase synchronism with an applied sync signal.

3. The system defined in claim 2, wherein said sync signal originates at and is transmitted as part of a composite signal to said system from a remote location, and wherein said system includes a receiver for receiving said composite signal, and means for separating said sync signal from said received composite signal and applying said separated sync signal to said synthesizer.

4. The system defined in claim 2, wherein said generating means further includes a master oscillator for generating said sync signal and means for applying said sync signal to said synthesizer.

5. The system defined in claim 1, wherein said last-named means comprises an adder for intensity modulating said flying spot with a sum signal of said amplitude-modulated carrier signals applied from said modulation means as separate inputs thereto.

6. The system defined in claim 1, wherein each of said separate channel information signals is a video signal manifesting a different color of a multi-colored scene which has been line scanned at said line-scan rate.

7. The system defined in claim 6, comprising film-editing means including a plurality of light scanning means and corresponding color separation and detection means for simultaneously deriving a multi-channel set of color-manifesting video signals for each of a plurality corresponding color transparencies, and a signal processor and selector having all of said sets applied as inputs thereto for deriving therefrom a single output set of color-manifesting video signals, said output set being applied to said modulating means as said separate channel information signals.

8. A method for recording a color-encoded scene on a black-and-white recording medium with a flying spot recorder, that scans a given area of said medium at a given line-scan rate, said method comprising the step of intensity-modulating the flying spot of said recorder with a composite signal, wherein said composite signal includes a plurality of simultaneously occurring different amplitude-modulated carrier frequencies each of which corresponds to a different respective color component of said color-encoded scene, and wherein all of said carrier frequencies are coherent and are higher than but phase-locked with said line-scan rate and are characterized in that the division of the respective carrier frequencies by said line scan rate yield quotients which are different from each other.

9. A multichannel-encoded recording on the same area of a black-and-white recording medium in which the encoding is manifested over said area by spatial intensity modulation about a predetermined gray bias level by a predetermined composite modulating signal, said predetermined composite modulating signal comprising separate spatial carriers frequency components each amplitude modulated by a different one of said channels, each spatial carrier frequency component defining a synthetic grating having selected angular orientation and line spacing parameters with at least one of said parameters being different in any one of said spatial carrier frequency components from the parameters of any other of said spatial carrier frequency components, whereby said multichannel-encoded recording does not contain baseband information.

* * * * *